May 21, 1968 P. F. VAR 3,384,884
MOVABLE CORE DIFFERENTIAL TRANSFORMER POSITION SENSOR
Filed Oct. 15, 1965
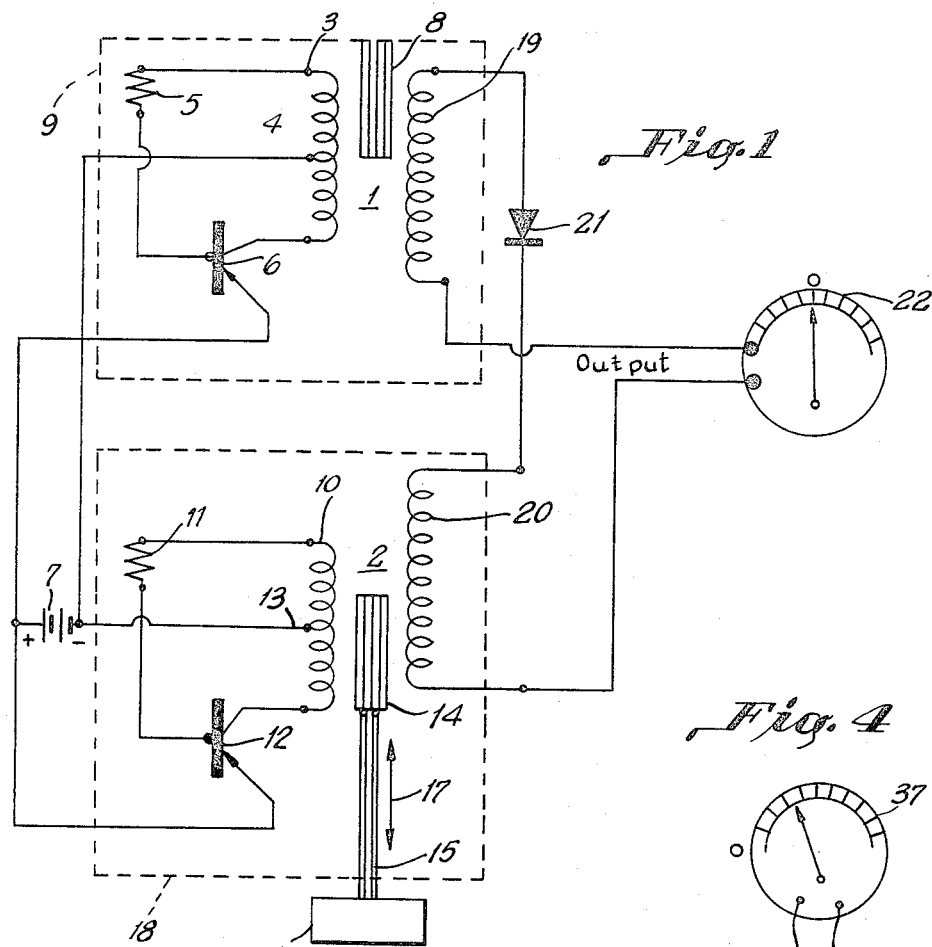
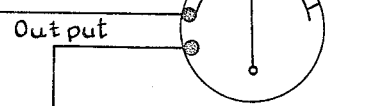
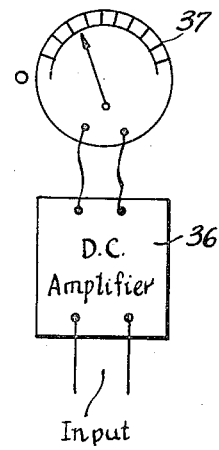
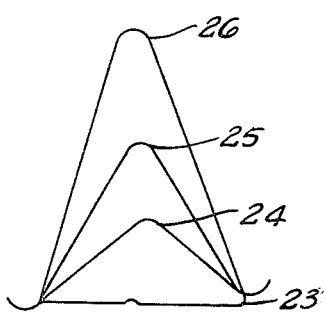
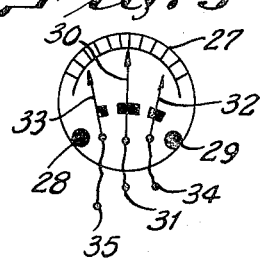
INVENTOR.
Paul Frank Var 3,384,884
MOVABLE CORE DIFFERENTIAL TRANSFORMER
POSITION SENSOR
Paul Frank Var, R.R. 1, P.O. Box 255,
Petersburg, N.Y. 12138
Filed Oct. 15, 1965, Ser. No. 496,534
7 Claims. (Cl. 340—196)

ABSTRACT OF THE DISCLOSURE

A position sensor in which a magnetic core of high permeability operating within a resonant circuit is rigidly attached to and manipulated by any convenient prime mover resulting in a corresponding electronic output signal which, when applied to a microammeter or other suitable indicator, provides an accurate indication of the true position of the prime moving object or any microscopic deviation therefrom. Likewise, by observation of initial readout data, the prime mover object can be returned to any predetermined position.

In general, in two identical transistorized oscillator circuits consisting of a DC supply, a transistor, bias resistor and the primary of a transformer having a magnetic core, the core of one transformer is set in a fixed resonant position while the core of the other transformer is free to move responsive to an external force to which it is connected. Each transformer has a secondary winding of equal turns, series connected in polarity opposition through a single diode. The sum total output of this series combination is recorded on a visual indicating meter. When both cores of each of the oscillator circuits are in a frequency resonant position, the oscillators remain locked together frequency-wise; any deviation from this null position of the movable core which is attached to an object as a prime mover will reflect a change in the DC output voltage, either positive or negative, depending on the direction of said motion. The object's position can therefor be readily detected.

In practice, a device of this type is found to be useful in many applications where a minute mechanical movement is to be transformed into an electrical signal with extreme high accuracy and sensitivity.

It is therefore the object of this invention to provide an electronic sensing system of ultra microscopic capabilities, having linear characteristics with respect to the movement of an object and to visually indicate same.

Another object of the present invention is to provide a sensing system so that an object can be relocated to some predetermined location.

A further object is to provide a self-contained unit which is stable and free from harmonics and can be manufactured at a moderate cost.

Other objects, features, and advantages will become apparent from the following detailed description in combination with the accompanying drawing in which:

FIGURE 1 is generally a schematic illustration of a practical position sensor.

FIGURE 2 represents actual oscilloscope pictures for various sensor positions as seen by the readout indicator.

FIGURE 3 is a diagrammatic representation of a relay type meter.

FIGURE 4 shows a DC amplifier as an auxiliary device employed to expand sensor output.

Referring to the drawing in FIG. 1, two identical oscillators are identified by their associated transformers 1 and 2 respectively, in which each is a circuit component. The primary 3 of transformer 1 has its center tap 4 connected to the negative supply of battery 7. One primary lead is connected through bias resistor 5 directly to the base of transistor 6; the remaining primary lead directly connects to the collector of transistor 6, while emitter of transistor 6 receives its power directly from the positive terminal of battery 7. All necessary components have thus been provided to satisfy the requirements of the Hartley oscillator circuit, and core 8 is now set permanently to operate at circuit resonant frequency. A suitable magnetic and electrostatic shield 9 prevents radiated interference.

Similarly, considering transformer 2 in its affiliated oscillator circuit, primary 10 has one of its leads connected through bias resistor 11 directly to the base of transistor 12, the collector of which is connected to the remaining primary lead. Said primary 10 connected as shown in the drawing will then be in phase relation to primary 3. Primary 10 has its center tap 13 connected to the negative terminal of common battery 7. The emitter of transistor 12 connects to the positive terminal of battery 7. Magnetic core 14, free to move, is rigidly connected onto a non-magnetic rod 15 which is further affixed onto a movable mechanical device 16 which is free to move in the directions indicated by arrows 17 in response to some external function. Magnetic and electrostatic shield 18 prevents radiated interference. Secondary 19 and secondary 20 of the two identical transformers are series connected through diode 21 in polarity opposition. The sum total or difference DC output is connected to DC D'Arsonval type zero center microammeter 22.

On operation by virtue of the common battery supply 7 and the capacity between primary and secondary windings, feed back is sufficient to hold both oscillators locked together in phase and frequency for all practical limits. Therefore, at resonace the AC output of winding 19 is exactly equal an opposite to the AC output of winding 20; hence, a null condition exists and meter 22 reads zero.

In referring to FIG. 2 oscilloscope pictures at the output of the series combination of secondaries 19 and 20 with diode 21 gives the curve 23. For successive and various positions of prime mover 16 in any one direction, oscilloscope patterns 24, 25, and 26 are then further observed.

FIG. 3 shows a relay type meter 27 of the D'Arsonval type. The magnetic movement terminals are 28 and 29. The meter indicating needle 30 has an external connecting terminal 31 and carries a set of double contacts which physically mate with each of two other contacts on high set adjustment 32 arm and low adjustment arm 33. High limit adjustment relay contact has an external connection on terminal 34 while the low limit relay adjustment arm has an external electrical connection on terminal 35. In essence, a high limit relay switching device exists when terminals 31 and 34 are associated with a remote external circuit while terminals 31 and 35 may be used in relay switching such as in a low warning circuit. In practice, said relay type meter replaces indicating meter 22 FIG. 1, when sensor output is connected to terminals 28 and 29 of FIG. 3.

FIG. 4 illustrates a DC high gain amplifier 36 when input terminals are connected to the output of position sensor FIG. 1 replacing indicator 22 and with amplifier output connected to meter 37 of the D'Arsonval type. The system becomes highly sensitized to a degree limited only by circuit component noise. In effect, the amplifier performs the function of expanding the visual meter scale thus sensitizing the readout capabilities. The DC amplifier illustrated is powered by a self-contained battery.

Having carefully and fully described my invention, what I claim and desire to secure by Letters Patent is:

1. In a position sensing system, the combination comprising a pair of transformers, a magnetic core for each said transformer, at least one of said cores being movable, a center tapped primary winding for each said transformer, an oscillator connected to all terminals of each said primary winding, a secondary winding for each said transformer connected in series opposition, a rectifier, an indicator, said secondary windings, said rectifier, and said indicator all connected in series, and means to move at least said one movable core to provide a reading on said indicator.

2. In a position sensing system in accordance with claim 1 wherein each oscillator comprises a transistor.

3. In a position sensing system in accordance with claim 1 further comprising a magnetic shield enclosing each said transformer and oscillator.

4. In a position sensing system in accordance with claim 1 wherein said rectifier is a diode.

5. In a position sensing system in accordance with claim 1 wherein said transformers and oscillators are identical.

6. In a position sensing system in accordance with claim 1 wherein an amplifier is connected between said indicator and said secondary windings.

7. In a position sensing system in accordance with claim 1 wherein said indicator is a DC relay meter.

References Cited

UNITED STATES PATENTS

| | | | |
|---|---|---|---|
| 2,932,972 | 4/1960 | Cosby et al. | 73—398 |
| 2,992,373 | 7/1961 | Golding | 340—199 X |
| 3,091,122 | 5/1963 | Pike et al. | 323—51 X |
| 3,100,889 | 8/1963 | Cannon | 340—199 X |
| 3,142,794 | 7/1964 | Pegram | 323—51 |
| 3,235,790 | 2/1966 | Collins | 323—51 |

MILTON O. HIRSHFIELD, *Primary Examiner.*

W. E. RAY, *Examiner.*